US011401564B2

(12) United States Patent
Castagnola et al.

(10) Patent No.: US 11,401,564 B2
(45) Date of Patent: Aug. 2, 2022

(54) METHOD FOR OPERATING A METALLURGICAL FURNACE

(71) Applicant: PAUL WURTH S.A., Luxembourg (LU)

(72) Inventors: Cristiano Castagnola, Genoa (IT); Lorenzo Micheletti, Castagneto Carducci (IT)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 17/611,367

(22) PCT Filed: May 13, 2020

(86) PCT No.: PCT/EP2020/063342
§ 371 (c)(1),
(2) Date: Nov. 15, 2021

(87) PCT Pub. No.: WO2020/229545
PCT Pub. Date: Nov. 19, 2020

(65) Prior Publication Data
US 2022/0145411 A1    May 12, 2022

(30) Foreign Application Priority Data
May 14, 2019   (LU) .................................. 101210

(51) Int. Cl.
*C21B 5/06*    (2006.01)
*C21B 11/02*   (2006.01)

(52) U.S. Cl.
CPC ............... *C21B 5/06* (2013.01); *C21B 11/02* (2013.01); *C21B 2100/22* (2017.05); *C21B 2100/26* (2017.05)

(58) Field of Classification Search
CPC ....... C21B 5/06; C21B 11/02; C21B 2100/22; C21B 2100/26
(Continued)

(56) References Cited

U.S. PATENT DOCUMENTS

2019/0032160 A1 *  1/2019  Ito .............................. C21C 1/10

FOREIGN PATENT DOCUMENTS

| DE | 102013015019 A1 | 3/2015 |
| GB | 2513185 A | 10/2014 |

(Continued)

OTHER PUBLICATIONS

Translation of JP2001240906A (Year: 2001).*
(Continued)

*Primary Examiner* — Brian D Walck
*Assistant Examiner* — Danielle Carda
(74) *Attorney, Agent, or Firm* — Cantor Colburn LLP

(57) ABSTRACT

A method for operating a metallurgical furnace and a simplified way of providing synthesis gas for a metallurgical furnace, includes the following steps
performing a combustion process outside the metallurgical furnace by combusting a carbon-containing material with an oxygen-rich gas to produce an offgas, which offgas is a $CO_2$ containing gas;
and combining the offgas, while having an elevated combustion-induced temperature due to the combustion process, with a hydrocarbon-containing fuel gas to obtain a first gas mixture having a temperature above a reforming temperature necessary for a reforming process, preferably a dry reforming process;
the first gas mixture undergoing the reforming process, thereby producing a synthesis gas containing CO and $H_2$, the reforming process being performed non-catalytically; and
feeding the synthesis gas into the metallurgical furnace.

15 Claims, 2 Drawing Sheets

(58) Field of Classification Search
USPC .......................................................... 75/458
See application file for complete search history.

(56) References Cited

FOREIGN PATENT DOCUMENTS

| JP | 2001240906 A | 9/2001 |
| JP | 2007009068 A | 1/2007 |
| JP | 2017172026 A | 9/2017 |
| WO | 2016048709 A2 | 3/2016 |
| WO | 2019057930 A1 | 3/2019 |

OTHER PUBLICATIONS

International Preliminary Report on Patentability dated Feb. 1, 2021 re: Application No. PCT/EP2020/063342, pp. 1-13, citing: WO 2016/048709 A2 and JP 2001 240906 A.
International Search Report dated Jun. 19, 2020 re: Application No. PCT/EP2020/063342, pp. 1-3, citing: WO 2016/048709 A2, JP 2001 240906 A, GB 2 513 185 A and DE 10 2013 015019 A1.
Written Opinoin dated Jun. 19, 2020 re: Application No. PCT/EP2020/063342, pp. 1-6, citing: WO 2016/048709 A2, JP 2001 240906 A, GB 2 513 185 A and DE 10 2013 015019 A1.
KR Office Action dated Apr. 11, 2022 re: Application No. 10-2021-7038034, pp. 1-11, citing: JP 2017-172026, JP 2007-009068 and WO 2016/048709.

\* cited by examiner

METHOD FOR OPERATING A METALLURGICAL FURNACE

TECHNICAL FIELD

The disclosure relates to a method for operating a metallurgical furnace.

BACKGROUND

Despite alternative methods, like scrap melting or direct reduction within an electric arc furnace, the blast furnace today still represents the most widely used process for steel production. One of the concerns of a blast furnace installation is the blast furnace gas exiting the blast furnace. Since this gas exits the blast furnace at its top it is commonly also referred to as "top gas". While, in the early days, this blast furnace gas may have been allowed to simply escape into the atmosphere, this has long been considered a waste of resources and an undue burden on the environment. One component in the blast furnace gas is $CO_2$, which is environmentally harmful and is mainly useless for industrial applications. Indeed, the blast furnace gas exiting the blast furnace typically comprises a concentration of $CO_2$ as high as 20% to 30%. Apart from this, the blast furnace gas usually comprises considerable amounts of $N_2$, CO, $H_2O$ and $H_2$. The $N_2$ content, however, largely depends on whether hot air or (pure) oxygen is used for the blast furnace.

In order to reduce the $CO_2$ emissions, it has been proposed to reform the blast furnace gas in order to obtain a synthesis gas (also referred to as syngas) that can be used for several industrial purposes. According to the most common reforming process, the blast furnace gas is mixed with a fuel gas that contains at least one hydrocarbon (e.g. $CH_4$ and possibly higher molecular weight hydrocarbons). In a so-called dry reforming reaction, the hydrocarbons of the fuel gas react with the $CO_2$ in the blast furnace gas to produce $H_2$ and CO. In a so-called wet reforming reaction, the hydrocarbons react with the $H_2O$ in the blast furnace gas also to produce $H_2$ and CO. Either way, a synthesis gas is obtained that has a significantly increased concentration of $H_2$ and CO. It has also been proposed to use this synthesis gas as a reducing gas, which can be recycled, i.e. re-introduced into the blast furnace. According to one process, the synthesis gas is fed into the blast furnace together with oxygen enriched hot blast (i.e. hot air) and pulverized coal. This type of furnace can also be referred to as a "syngas blast furnace".

Another potential use for synthesis gas is in context with the objective to increase the auxiliary fuel (e.g. pulverized coal) going to the blast furnace at the tuyere level. Doing this requires increasing the oxygen content in the hot blast and, related with that, reducing of the hot blast rate. This, in turn, would lead to an undesirable reduction of the top gas temperature. This effect can be counterbalanced by shaft injection of a hot gas, in particular a hot reducing gas. A synthesis gas as described above can be used for this purpose. However, while synthesis gas production using e.g. blast furnace gas can be achieved as described e.g. in WO 2019/057930 A1, the reforming process is endothermic and therefore requires considerable heating of the blast furnace gas and/or the fuel gas. In some cases, a catalyst is required to support the reforming process. The heating increases the complexity of the reforming process and also necessitates fuel consumption for burners or the like, thereby partially undoing the $CO_2$ reduction achieved by the top gas recycling.

Thus the present disclosure provides a simplified way of providing synthesis gas for a metallurgical furnace. This is solved by a method according to claim 1.

SUMMARY

The disclosure provides a method for operating a metallurgical furnace. In a first step, a combustion process is performed outside the metallurgical furnace by combusting a carbon-containing material with an oxygen-rich gas to produce an offgas, which offgas is a $CO_2$ containing gas. The carbon-containing material can be solid, liquid and/or gaseous. It can also be a mixture of different chemical substances containing carbon. Normally, the carbon is not contained in elementary form, but as part of a chemical compound, e.g. a hydrocarbon. In particular, the carbon-containing material may comprise tar, coke breeze, charcoal, coal and/or heavy fuel oil. In the combustion process, the carbon-containing material is combusted, i.e. burned, with an oxygen-rich gas. The oxygen-rich gas is in general a gas that has a $O_2$ concentration significantly higher than air. Normally, the oxygen-rich gas consists mainly of $O_2$, i.e. it has an $O_2$ concentration of more than 50%. Preferably, it contains at least 60%, preferably at least 80%, more preferably at least 90% of $O_2$. In some cases, the oxygen-rich gas may even be referred to as "oxygen", although it is understood that minor concentrations (e.g. <5%) of other components like $N_2$ can hardly be avoided. The product of the combustion process is an offgas, which contains $CO_2$. It is understood that the offgas may contain other components, like $H_2O$, CO and unreacted components of the carbon-containing material and/or the oxygen-rich gas. However, the $CO_2$ content can be relatively high, e.g. above 30%. The combustion process is performed outside the metallurgical furnace, i.e. it is not part of the internal processes inside the metallurgical furnace. However, it may be performed inside a reactor close to the metallurgical furnace. Combusting the carbon-containing material with the oxygen-rich gas can lead to very high flame temperatures, e.g. above 2000° C., 2500° C. or even 3000° C.

In another step, the offgas, while having an elevated combustion-induced temperature due to the combustion process, is combined with a hydrocarbon-containing fuel gas to obtain a first gas mixture having a temperature above a reforming temperature necessary for a reforming process, preferably for a dry reforming process. The fuel gas may e.g. comprise coke oven gas (COG), natural gas and/or biogas. In particular, it may comprise a mixture of any of these gases. It normally has a high concentration of low-molecular hydrocarbons, in particular $CH_4$. In the first gas mixture, the offgas and the fuel gas can be more or less well mixed. Combining the offgas with the fuel gas in general refers to "allowing the offgas to mix with the fuel gas". This may comprise (actively) mixing the offgas with the fuel gas, i.e. applying mechanical force to mix the gases. However, in some cases it may be sufficient e.g. to inject the two gases into a vessel, so that mixing occurs more or less passively by convection and/or diffusion. It is understood, though, that the chemical reaction is enhanced by a higher degree of mixing. Combining the offgas with the fuel gas to obtain the first gas mixture includes the possibility that only the offgas and the fuel gas are combined as well as the possibility that at least one more gas is used for the first gas mixture. It is possible that the (at least) two gases are combined in a dedicated vessel which may be referred to as a mixing vessel or mixing chamber. The offgas is combined with the fuel gas while it has an elevated temperature due to the combustion process, which herein is referred to as a combustion-induced temperature. This combustion-induced temperature is of course due to the highly exothermic nature of the combustion process. When the offgas is combined with the fuel gas, the gas mixture therefore also has a high temperature, which is above a reforming temperature that is necessary for the reforming process, preferably dry reforming process. The dry reforming process, which will be described in the following, requires the first gas mixture to have a certain minimum temperature, herein referred to as the reforming temperature. If the first gas mixture has at least this reforming temperature, the reforming process advantageously starts and proceeds without the need for a catalyst or additional heating.

In another step of the method, the gas mixture undergoes the (preferably dry) reforming process, thereby producing a synthesis gas containing CO and $H_2$. The chemical mechanism of the dry reforming process is not limited within the scope of the disclosure, but it normally comprises at least that the $CO_2$ content of the offgas reacts with the hydrocarbon in the fuel gas, e.g. according to the following reaction: $CO_2+CH_4 \rightarrow 2H_2+2CO$. This is commonly referred to as dry reforming. Apart from this, a $H_2O$ content of the offgas, if present, may react with the hydrocarbon in the fuel gas, e.g. according to the following reaction: $H_2O+CH_4 \rightarrow 3H_2+CO$. This may also be referred to as wet reforming. The dry reforming process requires an elevated reforming temperature, which depends on several factors like the presence or absence of a catalyst. Without a catalyst, the reforming temperature should be e.g. above 800° C. and may preferably be between 900° C. and 1600° C. Since the combustion-induced temperature of the offgas is sufficiently high to initiate and sustain the dry reforming process once the offgas is combined with the fuel gas, the dry reforming process can be carried out in the same vessel as the combining (or mixing) of the gases. It should be noted that the dry reforming process may be carried out under elevated pressure. In particular, this may be due to not allowing the offgas to expand after the combustion process. Advantageously, the (preferably dry) reforming process proceeds without the need for a catalyst. In other words, the reforming process is performed non-catalytically. Another advantage of the present disclosure is to reduce the need and costs for reformed gas cleaning. Indeed, as no catalyst is used, there is no need to clean the reformed gas from catalysts poisoning agent before using this reformed gas in any other process.

It should be noted that although at least some offgas needs to be mixed with some fuel gas in order to start the reforming process, the mixing and the reforming can occur at least partially simultaneously. In fact, this is usually the case, since the reforming process is initiated by the elevated combustion-induced temperature of the offgas.

In another step of the method, the synthesis gas is fed into the metallurgical furnace. As will be explained below, this includes the possibility that the synthesis gas is mixed with another gas before it is fed into the metallurgical furnace, i.e. it may be fed into the metallurgical furnace as part of a gas mixture. Mostly, the synthesis gas works as a reducing gas inside the metallurgical furnace.

A great advantage of the inventive method is that it uses the heat generated by the exothermic combustion process to initiate and sustain the (preferably dry) reforming process. It could also be said that the (preferably dry) reforming process is effectively driven by the high flame temperatures of the combustion process. This simplifies the process and eliminates the need for additional heating of the gas mixture and/or the presence of a catalyst.

The offgas, when being combined with the hydrocarbon-containing gas, may have rather high temperature, which is herein referred to as a combustion-induced temperature, because it results from the exothermic combustion and occurs after this combustion. In particular, the combustion-induced temperature may be above 1000° C., preferably above 1500° C., more preferably above 2000° C. These temperatures usually are sufficient to initiate and sustain the reforming process. It is understood that this also depends on the ratio between the offgas and the hydrocarbon-containing gas and the temperature of the latter.

It is possible to support the reforming process by heating the fuel gas, e.g. to a temperature above 500° C., before combining it with the offgas. However, due to the high combustion-induced temperatures, a relatively "cold" fuel gas may be used. More specifically, the fuel gas, when being combined with the offgas, may have a temperature below 100° C. In particular, the fuel gas may have ambient temperature, i.e. between 15° C. and 40° C.

Optionally, the offgas and the fuel gas may be combined with a supplemental gas, which is a $CO_2$ containing gas, to form the first gas mixture. The supplemental gas may be regarded as a supplement to the offgas in that it also adds $CO_2$ to the gas mixture. Various sources could be used for the supplemental gas. For instance, the supplemental gas may be blast furnace top gas and/or basic oxygen furnace gas and/or a carbon capture gas generated by a carbon capture device. As is known in the art, a carbon capture device separates a $CO_2$ containing gas into a first portion with a reduced $CO_2$ content and a second portion with an increased $CO_2$ content. The latter portion, which is herein referred to as the carbon capture gas, can be used as the supplemental gas. For instance, a carbon capture device used for treating coke oven gas may be used as a source for the carbon capture gas. However, if the supplemental gas is used as a component for the first gas mixture, this normally lowers the temperature of the first gas mixture since the temperature of e.g. a carbon capture gas is significantly lower than the combustion-induced temperature of the offgas. Thus, the ratio of the supplemental gas has to be adjusted in order to keep the temperature of the first gas mixture above the reforming temperature. The supplemental gas can be supplied at ambient temperature or can alternatively be pre-heated to temperature up to 500° C. Pre-heating will further increase the capacity of supplemental gas that could be used in this process.

As mentioned above, combustion-induced temperature of the offgas may be above 2000° C. Normally, even if the fuel gas has been heated before being combined with the offgas, the resulting gas mixture has an (average) temperature below the combustion-induced temperature. Furthermore, the (preferably dry) reforming process is an endothermic reaction which leads to a temperature decrease. However, the temperature of the resulting synthesis gas, which may be referred to as a post-reforming temperature, may still be very high. Immediately after the reforming process, the synthesis gas may have a post-reforming temperature above 1000° C., preferably above 1200° C., more preferably above 1500° C. This means that the post-reforming temperature may be too high for immediate introduction into the metallurgical furnace. This of course depends on the type of the metallurgical furnace and the location where the synthesis gas is fed into the metallurgical furnace. In general, any disturbance of the temperature profile inside the metallurgical furnace is to be avoided.

According to one embodiment, the metallurgical furnace is a shaft furnace. Such a shaft furnace may be used for producing direct reduced iron, e.g. with the Midrex or HYL process, or hot briquetted iron. In particular, the metallurgical furnace may be a blast furnace. The general setup and working principle of a blast furnace is known in the art and therefore will not be explained here in detail. There are several options as to where the synthesis gas can be introduced into the blast furnace.

According to one option, the synthesis gas is fed into the blast furnace at a tuyere level. The tuyere level corresponds to the melting zone of the blast furnace, for which temperatures between 1400° C. and 1800° C. are characteristic. At the tuyere level, even a high the post-reforming temperature of the synthesis gas above 1500° C. is not detrimental and the synthesis gas can be directly fed into the blast furnace.

According to another option, the synthesis gas is fed into the blast furnace at a shaft level above the tuyere level. The shaft level largely corresponds to a reduction zone of the blast furnace, which normally has significantly lower temperatures than the melting zone. E.g. the temperatures at the shaft level may be between 800° C. and 1100° C. This is mostly below the post-reforming temperature of the synthesis gas. Immediate introduction of the hot synthesis gas at the shaft level could detrimentally affect the temperature distribution inside the blast furnace. It would be conceivable to cool the synthesis gas down to a sufficiently low temperature. However, cooling corresponds to an energy loss, which is undesirable. It would be conceivable, though, to use the heat lost in the cooling process in a heat exchanger e.g. to heat the fuel gas before it is combined with the offgas.

It should be noted that if the synthesis gas is fed into the blast furnace at the shaft level, other gases and/or solids are fed into the blast furnace at the tuyere level. To this respect, there are no limitations within the scope of the disclosure. In particular, an auxiliary fuel can be introduced at the tuyere level. One option would be that pulverized coal is fed into the blast furnace at the tuyere level along with an oxygen-rich gas. This kind of process, which is also referred to as pulverized coal injection (PCI) is principally known in the art. Another option is to inject a gas that contains hydrocarbons like $CH_4$, e.g. natural gas, CO and/or $H_2$. In general, it is desirable to increase the amount of auxiliary fuel injected at the tuyere level, which necessitates to increase the oxygen content in the hot blast and to decrease the hot blast rate. This, in turn, could reduce the top gas temperature to an unwanted extent. If, however, a hot reducing gas—like the synthesis gas provided by the inventive method—is introduced above the tuyere level, a reduction of the top gas temperature can be prevented or at least be limited.

In this context, it should be noted that reducing the gas flow through the blast furnace significantly decreases the risks of certain irregularities, like flooding or hanging and slipping. Since injection of the synthesis gas at the shaft level allows to reduce the gas flow while maintaining a sufficiently high top-gas temperature, it has a beneficial effect on the productivity of the blast furnace.

A preferred option to avoid any energy loss by cooling is that the synthesis gas is fed into the metallurgical furnace along with an additive gas having a temperature lower than the post-reforming temperature of the synthesis gas, which additive gas is a CO and/or $H_2$ containing gas. In other words, the composition of the additive gas and the synthesis gas at least partially correspond to each other in that both contain CO and/or $H_2$. Therefore, the additive gas can also be used as a reduction gas inside the metallurgical furnace. By way of example, all steelmaking gases can be used for the additive gas, e.g. blast furnace gas, basic oxygen furnace gas or others. Even if the CO and/or $H_2$ content of the additive gas may be quite low, the proportion of this "cooling gas" in the mixture with syngas is normally limited and the dilution effect is acceptable. This embodiment can in particular be used if the metallurgical furnace is a blast furnace and the synthesis gas is fed into the metallurgical furnace at the shaft level. The average temperature of the synthesis gas and the additive gas is of course lower than the post-reforming temperature of the synthesis gas, wherefore detrimental effects on the temperature distribution inside the blast furnace can be avoided. It should be noted that the additive gas may also be a synthesis gas produced by a separate reforming process. For example, this could even be a reforming process using blast furnace gas.

One could consider introducing the synthesis gas and the additive gas into the metallurgical furnace separately, but in the same region of the metallurgical furnace. To some extent, they might mix inside the metallurgical furnace before reacting. However, introducing the two gases separately could lead to temperature differences that could locally alter the processes in the metallurgical furnace. In such a case, the synthesis gas may locally heat a portion of the metallurgical furnace, while the additive gas cools a portion of the metallurgical furnace, which is mostly detrimental. It is therefore preferred that the synthesis gas is mixed with the additive gas before it is fed into the metallurgical furnace. This results in a second gas mixture of the two gases that has a temperature in between the post-reforming temperature and the temperature of the additive gas before mixing. In particular, the resulting second gas mixture may have a temperature between 700° C. and 1200° C., preferably between 800° C. and 1100° C. This temperature range is beneficial for feeding into the blast furnace at the shaft level. Apart from leading to a more uniform temperature distribution, mixing the gases and introducing the mixture into the metallurgical furnace also simplifies the design of the injection system.

BRIEF DESCRIPTION OF THE DRAWINGS

Preferred embodiments of the disclosure will now be described, by way of example, with reference to the accompanying drawings, in which.

DETAILED DESCRIPTION OF THE DRAWINGS

Figure 1:
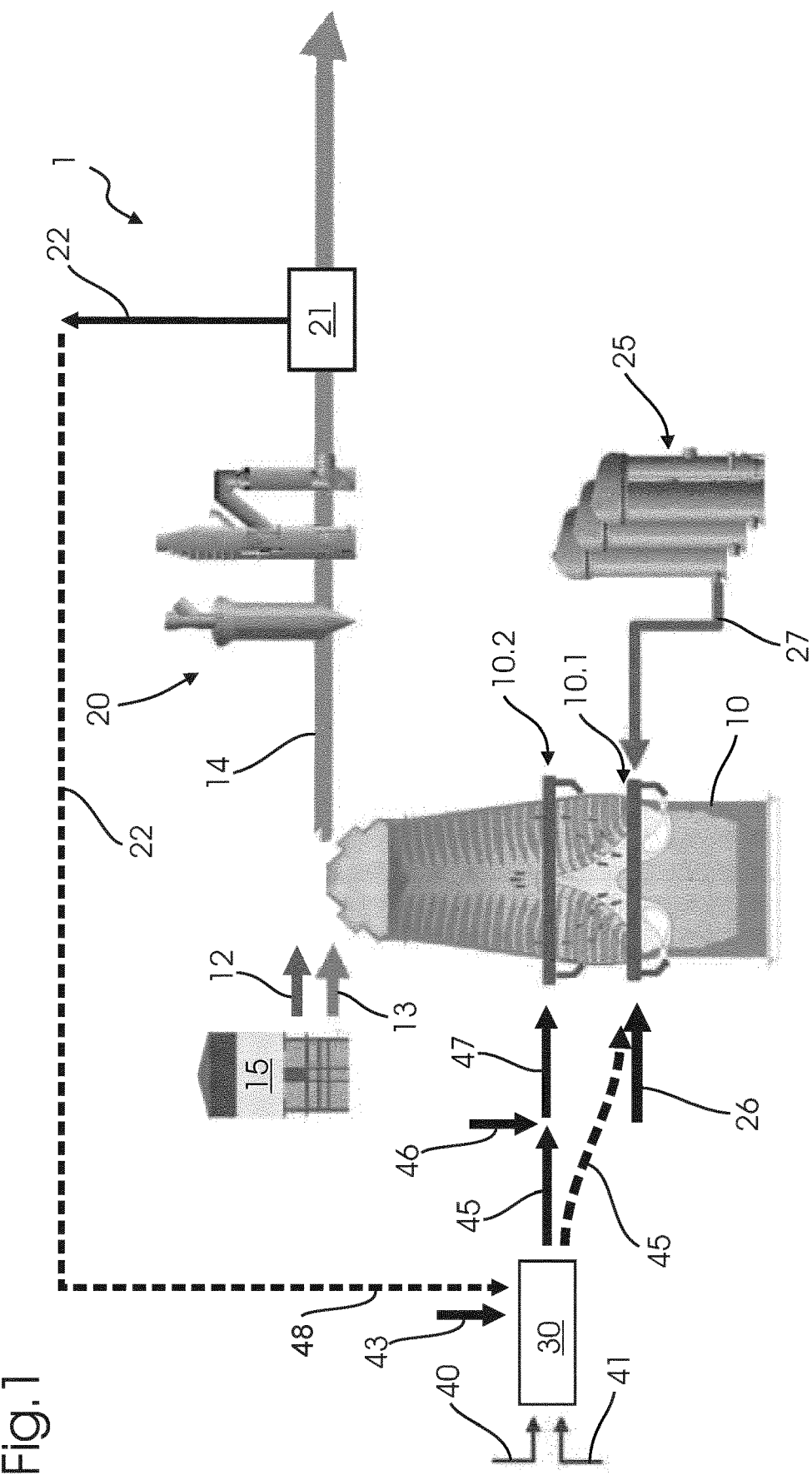
FIG. 1 is a schematic view of a blast furnace installation for carrying out an embodiment of the inventive method.

FIG. 1 schematically shows a blast furnace installation 1 comprising a blast furnace 10. At its top end, blast furnace 10 generally receives coke 12 and ore 13 from a stock house 15. At the bottom end of the blast furnace 10, pig iron and slag are extracted (which is not shown for sake of simplicity). The operation of the blast furnace 10 itself is well known and will not be further described herein. At the top end, blast furnace gas 14 is recovered from the blast furnace 10. The recovered blast furnace gas 14, which e.g. may have a $N_2$ concentration below 40%, a CO and $CO_2$ concentration of about 25-40% each and about 5-15% of $H_2$, may be treated in a gas cleaning plant 20, mostly for removing particulate matter from the blast furnace gas 14 and possibly condensing a part of the vapour contained in the blast furnace gas 14. The recovered and cleaned blast furnace gas 14 may be used for various purposes which are not discussed here in detail. After cleaning the blast furnace gas 14, its $CO_2$ content may be reduced in a carbon capture device 21. Here, a portion of the blast furnace gas is separated as a carbon capture gas 22, which is a gas having a high concentration of $CO_2$, e.g. more than 50% or more than 70%. This carbon capture gas 22, or part thereof, may be used as supplemental gas 48.

In the lower part of the blast furnace 10, namely at a tuyere level 10.1, the blast furnace 10 receives pulverised coal 26 and hot blast 27 provided from a hot stove plant 25 comprising a plurality of cowpers. The hot blast 27 may comprise air or an oxygen-rich gas. Alternatively, at the tuyere level, the blast furnace may receive a cold oxygen containing gas with a concentration typically of 95%, thereby largely or completely replacing the hot blast. Another option is that a synthesis gas 45 comprising CO and/or $H_2$ is injected together with the hot blast and/or cold oxygen containing gas and the pulverised coal.

Figure 2:
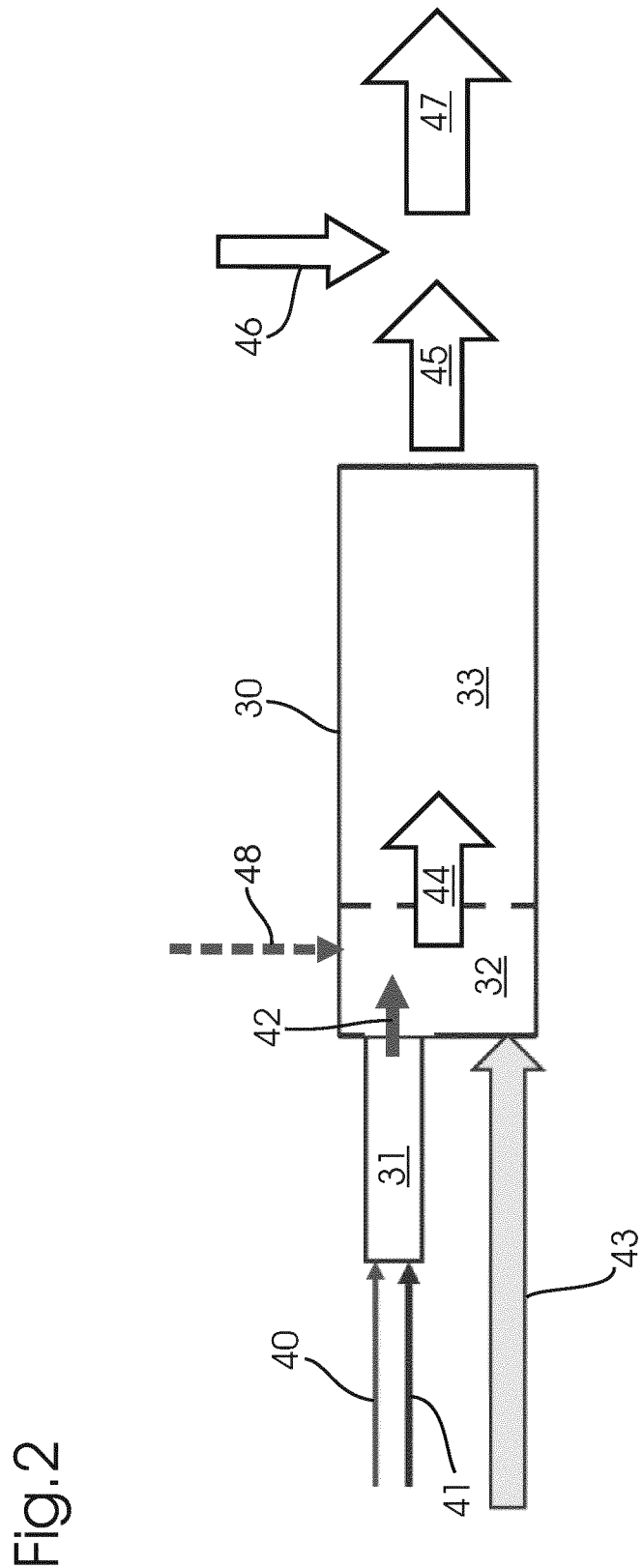
FIG. 2 is a schematic view of a part of the blast furnace installation from FIG. 1.

At a shaft level 10.2, which is located above the tuyere level 10.1, the blast furnace 10 receives a mixture 47 of a synthesis gas 45 and an additive gas 46. The synthesis gas 45 is prepared in a syngas reactor 30, which is schematically shown in FIG. 2. The syngas reactor 30 comprises a burner 31 that is supplied with an oxygen-rich gas 40 and a carbon-containing material 41. The oxygen-rich gas 40 may contain least 90% of $O_2$, while the carbon-containing material 41 may e.g. comprise tar, coke breeze, charcoal, coal and/or heavy fuel oil. The carbon-containing material 41 is burned with the oxygen-rich gas 40 in a combustion process in the burner 31, whereby an offgas 42 is produced, which by way of example may have a composition of e.g. 80% $CO_2$, 15% $H_2O$ and 5% $N_2$. Due to the strong exothermic combustion process, the flame temperature may be above 3000° C. The offgas 42 and a fuel gas 43 are injected into a mixing section 32 where they are mixed. The fuel gas 43 is a hydrocarbon-containing gas, e.g. coke oven gas, natural gas and/or biogas. When the offgas 42 is combined with the fuel gas 43, it has a combustion-induced temperature of at least 2000° C., while the fuel gas 43 may have a temperature below 100° C., e.g. ambient temperature. The fuel gas 43 and the offgas 42 form a first gas mixture 44 having a temperature above a reforming temperature that is necessary for a reforming process, preferably a dry reforming process. The reforming temperature should be above 800° C. and may preferably be between 900° C. and 1600° C. Due to the high temperature of the first gas mixture 44, which in turn is largely due to the combustion-induced temperature of the offgas 42, the reforming process starts without the need of additional heating or application of a catalyst. As an option, a supplemental gas 48 may be added to the fuel gas 43 and the offgas 42 to form the first gas mixture 44, Such supplemental gas 48 may e.g. be blast furnace gas and/or basic oxygen furnace gas and/or the carbon capture gas 22 (or at least a portion thereof), as indicated by the dashed arrow in FIGS. 1 and 2. Since the carbon capture gas 22 like the offgas 42 has a high $CO_2$ content, it may be used as a supplemental gas 48. However, since the temperature of the carbon capture gas 22 is significantly lower than the temperature of the offgas 42, the ratio of the carbon capture gas 22 is adjusted in order to keep the temperature of the first gas mixture above the reforming temperature. In FIG. 2, a reaction section 33 is shown next to the mixing section 32, but these need not be two different, distinguishable sections, since the reforming process begins as the fuel gas is mixed with the offgas.

The dry reforming process occurs according to the following reaction: $CO_2+CH_4 \rightarrow 2H_2+2CO$. It may be supported by an increased pressure inside the mixing section 32 and/or the reaction section 33. To some extent, a wet reforming may also occur according to the following reaction: $H_2O+CH_4 \rightarrow 3H_2+CO$. After undergoing the dry reforming process (and/or the wet reforming process), the offgas 42 and the fuel gas 43 and, if applicable, supplemental gas 48 are mainly converted into a synthesis gas 45, which comprises CO and $H_2$. Although the reforming process is an endothermic reaction which lowers the temperature of the synthesis gas 45 with respect to the gas mixture, a post reforming temperature of the synthesis gas 45 may still be above 1200° C. Since the synthesis gas 45 is intended for injection into the blast furnace 10 at the shaft level 10.2, the post-reforming temperature is incompatible with the temperature distribution inside the blast furnace 10. Therefore, an additive gas 46, which comprises CO and $H_2$, is introduced into the blast furnace 10 together with the synthesis gas 45. The additive gas 46 has the temperature that is significantly lower than the post-reforming temperature, for instance it could have ambient temperature. Preferably, the synthesis gas 45 and the additive gas 46 are mixed before they are introduced into the blast furnace 10, so that a resulting second gas mixture 47 has a temperature lower than the post-reforming temperature. In particular, the ratio of the two gases can be adjusted so that the mixture 47 has a temperature corresponding to the temperatures inside the blast furnace at the shaft level 10.2.

The introduction of the synthesis gas 45 and the additive gas 46 at the shaft level 10.2 helps prevent the top gas temperature of the blast furnace 10 from dropping below a certain level even if the gas flow through the blast furnace 10 is reduced. Reducing the gas flow is beneficial in that it reduces the likelihood of irregularities like flooding or hanging and slipping.

Alternatively or additionally to introducing the synthesis gas 45 into the blast furnace 10 at the shaft level 10.2, it could be introduced at the tuyere level 10.1, as indicated by the dashed arrow in FIG. 1. In this case, the post-reforming temperature is compatible with the temperatures inside the blast furnace 10 at the tuyere level 10.1. Therefore, there is no need to mix the synthesis gas 45 with any additive gas 46, i.e. the synthesis gas 45 can be fed into the blast furnace 10 as it is.

The invention claimed is:

1. A method for operating a metallurgical furnace, the method including the following steps:

performing a combustion process outside the metallurgical furnace by combusting a carbon-containing material with an oxygen-rich gas having a $O_2$ concentration significantly higher than air to produce an offgas, which offgas is a $CO_2$ containing gas, combining the offgas, while having an elevated combustion-induced temperature above 1000° C. due to the combustion process, with a hydrocarbon-containing fuel gas to obtain a first gas mixture having a temperature above a reforming temperature necessary for a reforming process, the first gas mixture undergoing the reforming process, thereby producing a synthesis gas containing CO and $H_2$, the reforming process being performed non-catalytically and being a dry reforming process and/or a wet reforming process; and feeding the synthesis gas into the metallurgical furnace.

2. The method according to claim 1, wherein the oxygen-rich gas contains at least 60% of $O_2$.

3. The method according to claim 1, wherein the offgas, when being combined with the hydrocarbon-containing fuel gas, has a combustion-induced temperature above 1500° C.

4. The method according to claim 1, wherein the hydrocarbon-containing fuel gas, when being combined with the offgas, has a temperature below 100° C.

5. The method according to claim 1, wherein the offgas and the hydrocarbon-containing fuel gas are combined with a supplemental gas, which is a $CO_2$ containing gas, to obtain the first gas mixture.

6. The method according to claim 1, wherein the carbon-containing material comprises tar, coke breeze, charcoal, coal and/or heavy fuel oil.

7. The method according to claim 1, wherein the hydrocarbon-containing fuel gas comprises natural gas, coke oven gas and/or biogas.

8. The method according to claim 1, wherein the synthesis gas immediately after the reforming process has a post-reforming temperature above 1000° C.

9. The method according to claim 8, wherein the synthesis gas is fed into the metallurgical furnace along with an additive gas having a temperature lower than the post-reforming temperature of the synthesis gas, which additive gas is a CO and/or $H_2$ containing gas.

10. The method according to claim 9, wherein the synthesis gas is mixed with the additive gas to form a second gas mixture before it is fed into the metallurgical furnace.

11. The method according to claim 10, wherein the second gas mixture has a temperature between 700° C. and 1200° C.

12. The method according to claim 1, wherein the metallurgical furnace is a shaft furnace.

13. The method according to claim 1, wherein the metallurgical furnace is a blast furnace.

14. The method according to claim 13, wherein the synthesis gas is fed into the blast furnace at a tuyere level.

15. The method according to claim 13, wherein the synthesis gas is fed into the blast furnace at a shaft level above a tuyere level.

* * * * *